United States Patent
Reznar et al.

(10) Patent No.: US 10,408,252 B2
(45) Date of Patent: Sep. 10, 2019

(54) SELF-LOCKING CHANNEL NUT AND RETAINER ASSEMBLY

(71) Applicant: A. Raymond et Cie SCS, Grenoble (FR)

(72) Inventors: Jason F. Reznar, Ferndale, MI (US); William Teller, Lake Orion, MI (US)

(73) Assignee: A. RAYMOND ET CIE SCS, Grenoble (FR)

( * ) Notice: Subject to any disclaimer, the term of this patent is extended or adjusted under 35 U.S.C. 154(b) by 136 days.

(21) Appl. No.: 15/608,451

(22) Filed: May 30, 2017

(65) Prior Publication Data

US 2018/0347614 A1 Dec. 6, 2018

(51) Int. Cl.
*F16B 37/04* (2006.01)
*F16B 7/18* (2006.01)

(52) U.S. Cl.
CPC ............ *F16B 37/046* (2013.01); *F16B 7/187* (2013.01); *F16B 37/044* (2013.01)

(58) Field of Classification Search
CPC ...... F16B 37/045; F16B 37/046; F16B 37/04; F16B 37/044
USPC .............................. 411/84, 85, 111, 112, 970
See application file for complete search history.

(56) References Cited

U.S. PATENT DOCUMENTS

| | | | | |
|---|---|---|---|---|
| 2,184,783 A * | 12/1939 | Tinnerman | ............ | F16B 37/041 411/34 |
| 2,635,666 A * | 4/1953 | Murphy | ................ | F16B 37/044 411/112 |
| 2,681,679 A * | 6/1954 | Poupitch | ............... | F16B 37/042 411/111 |
| 2,682,906 A * | 7/1954 | Poupitch | ............... | F16B 37/044 411/112 |
| 2,940,496 A * | 6/1960 | Patten | ................... | F16B 37/044 411/112 |
| 4,146,074 A * | 3/1979 | Kowalski | .............. | F16B 37/046 411/111 |
| 4,666,355 A * | 5/1987 | Stover | ................... | F16B 37/046 411/104 |
| 4,830,531 A | 5/1989 | Condit et al. | | |
| 5,067,863 A * | 11/1991 | Kowalski | .............. | F16B 37/044 411/112 |
| 5,271,586 A | 12/1993 | Stauffenberg | | |

(Continued)

FOREIGN PATENT DOCUMENTS

FR 3009043 A1 1/2015

*Primary Examiner* — Flemming Saether
(74) *Attorney, Agent, or Firm* — LeClairRyan (57) ABSTRACT

A channel nut and retainer assembly and method of attachment to a strut are disclosed. The assembly comprises a rotatable nut and a retainer. The retainer comprises a base wall and opposed side walls. Each of the side walls has an upper flange for mating with the upper edge of the strut and further includes a cantilevered holding leg extending from the upper flange. The retainer additionally includes actuation legs extending from the base wall. Each actuation leg includes a base wall connecting end and a nut driving end. The retainer additionally includes retention legs extending from the base wall. Each of the retention legs includes a leg holding hook. The retainer further includes rotation stops extending between the base wall of the retainer and the upper flanges of the retainer. The rotatable nut automatically rotates to a locking position upon attachment of the assembly to the strut.

1 Claim, 11 Drawing Sheets

(56) References Cited

U.S. PATENT DOCUMENTS

| | | | |
|---|---|---|---|
| 5,893,538 A | 4/1999 | Onishi et al. | |
| 7,204,666 B2 * | 4/2007 | Hullman | F16B 37/067 411/111 |
| 8,083,450 B1 * | 12/2011 | Smith | F16B 37/0842 411/111 |
| 9,121,431 B2 * | 9/2015 | Schraer | F16B 31/04 |
| 2001/0004099 A1 | 6/2001 | Qnishi | |
| 2002/0076299 A1 | 6/2002 | Ransil | |
| 2004/0165964 A1 | 8/2004 | Hilti | |
| 2008/0095591 A1 | 4/2008 | Wu | |
| 2008/0193253 A1 | 8/2008 | van Walraven | |
| 2010/0202853 A1 | 8/2010 | Hilti | |
| 2011/0121153 A1 | 5/2011 | Magno, Jr. et al. | |
| 2011/0179606 A1 | 7/2011 | Magno, Jr. et al. | |
| 2012/0308328 A1 * | 12/2012 | Ueno | F16B 37/045 411/134 |
| 2013/0071179 A1 | 3/2013 | Hilti | |
| 2013/0167749 A1 | 7/2013 | Spies et al. | |
| 2016/0298674 A1 | 10/2016 | Bouchenoire | |

* cited by examiner

SELF-LOCKING CHANNEL NUT AND RETAINER ASSEMBLY

TECHNICAL FIELD

The disclosed inventive concept relates generally to fastening systems for attaching a component to a strut or to a rail. More particularly, the disclosed inventive concept relates to a channel nut and retainer assembly having a self-locking feature. The disclosed inventive concept allows for quick, one-handed installation utilizing a retainer attached to the strut or rail and a retainer-held nut that rotates from an unlocked position to a locked position.

BACKGROUND OF THE INVENTION

It is common today to find vertically- and horizontally-placed find U-shaped rails or struts strategically attached to walls and ceilings of building structures, particularly in the industrial setting. These rails or struts are designed to aid in the installation of a wide variety of components, such as tubes for gas and air lines as well as electrical conduits and electrical control units, such as a breaker box. Because of their extreme versatility, rail and strut attachments are becoming increasingly attractive for most every structural application. Accordingly, the use of such rails or struts is on the increase.

The rails or struts are themselves anchored to the wall or to the ceiling by a variety of known methods, such as screws and bolts. A great variety of methods for attaching the component itself to the rail or strut are also known. These attachment systems provide a minimalistic approach of attachment. These methods are well-established and are conventionally include one to three piece assemblies that have provided little advancement in the art of attachment.

These systems typically include an elongated, rectangular threaded plate or lock nut and a coil steel spring or a resilient cup-shaped plastic component attached to the underside of the nut. On assembly, the elongated nut is manually rotated so that its long axis is parallel with that of the strut. With the nut so aligned, the nut and spring assembly are manually inserted into one end of the rail and the nut is manually rotated 90 degrees so that its long axis is now perpendicular to that of the strut. The assembly is manually then moved into position along the rail by sliding. Once in position, the free end of the spring rests against the inner base wall of the strut and provides a biasing force that holds the nut in position against the underside of the opposed strut rails. The bracket or other hardware is then mounted to the elongated nut by a fastener such as a threaded bolt.

Known approaches offer incremental features used to turn and lock the nut into place. Some versions do not provide a feature to turn the nut and lock into place. Accordingly, conventional attachment systems provide a manual cumbersome installation process that frequently requires two hands. The installation system is thus slow and does not ensure the installer that the fastener is either locked or fully installed properly. In addition, a considerable amount of adjustment of the nut is required.

Accordingly, known systems for attaching components to rails or struts are cumbersome and are time consuming in their installation. And, after the requisite installation efforts are undertaken, the resulting attachment system frequently fails to provide satisfactory results. As in so many areas of technology, there is always room for improvement related to designs for systems and methods for attaching a component to a rail or strut.

SUMMARY OF THE INVENTION

The disclosed inventive concept provides a fastener system and method of attachment for automatically attaching a channel nut and retainer assembly to a strut or rail. Once the channel nut and retainer assembly is attached to the strut, a component may be attached to the channel nut and retainer assembly using a conventional fastener such as a bolt. The channel nut and retainer assembly provides a positive and easy to achieve lock relative to the channel of the strut and includes only two components, thus enhancing its low cost and ease of use.

The channel nut and retainer assembly of the disclosed inventive concept is for use with a broad variety of struts or rails of the conventional types that include a channel defined by two opposed parallel sides. Each of the sides has an upper edge, the upper edge terminating in an inwardly-curved portion having an underside surface.

The channel nut and retainer assembly of the disclosed inventive concept comprises a rotatable nut and a retainer. The rotatable nut has an upper surface, a bore and stop walls. The retainer comprises a base wall and a pair of opposed side walls extending from the base wall. Each of the side walls has an upper flange for mating with the upper edge of the strut and further includes a cantilevered holding leg extending from the upper flange. The retainer additionally includes actuation legs extending from the base wall with each of the actuation legs including a base wall connecting end and a nut driving end. The retainer additionally includes retention legs extending from the base wall. Each of the retention legs includes a leg holding hook. The retainer further includes rotation stops extending between the base wall of the retainer and the upper flanges of the retainer.

Attachment of the channel nut and retainer assembly to the strut is achieved by the installer first selecting the desired attachment location. Once this selection is made, the installer presses the channel nut and retainer assembly into the strut until the upper flanges of the side walls mate with the upper edges of the channel sides. This movement causes the holding legs to deflect outward and the retention legs to be deflected, the retention legs returning to their initial position when insertion is complete and causing the holding hooks to engage the rail sides. This outward deflection of the holding legs allows the nut to automatically rotate a full 90 degrees to its locked position, the rotary action being cause by the nut driving end of the actuation legs. Rotation of the rotatable nut is halted when the stop walls of the nut engage the rotation stops of the retainer. Thus in position, the upper surface of the rotatable nut engages the underside surface of the inwardly-curved portions of the upper edges of the channel sides, thereby preventing movement of the channel nut and retainer assembly relative to the strut.

The channel nut and retainer assembly of the disclosed inventive concept is attachable to the strut without the need for first sliding the assembly into position. Instead, the installer can attach the channel nut and retainer assembly precisely to a desired location without movement along the strut. Accordingly, the channel nut and retainer assembly of the disclosed inventive concept may be attached to the rail by a single-handed operation.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 1:
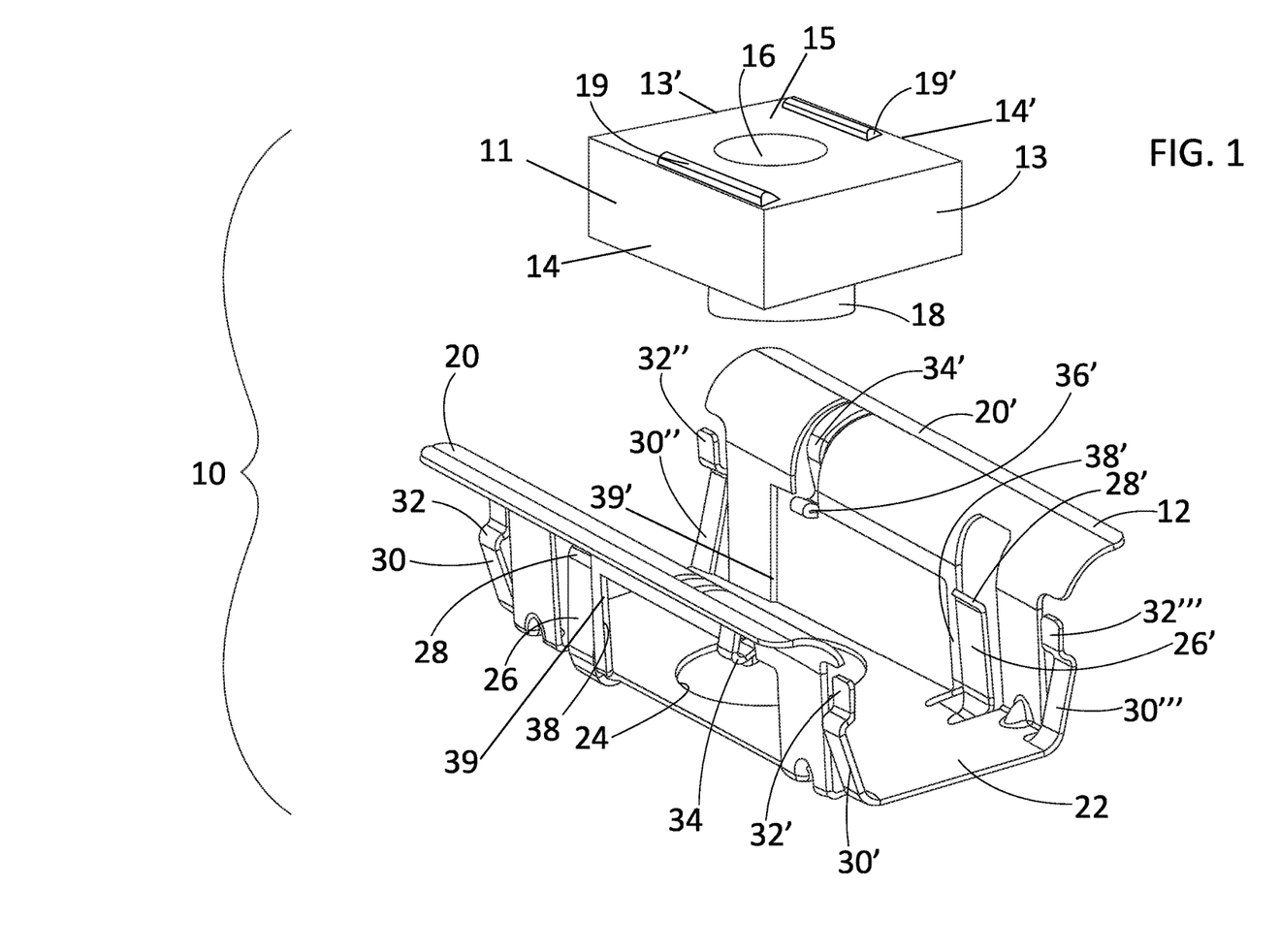
FIG. 1 is a perspective view of the channel nut and retainer assembly of the disclosed inventive concept illustrating the retainer and the rotatable nut spaced apart from the retainer before installation of the nut in the retainer.

The accompanying figures and the associated description illustrate a channel lock assembly according to the disclosed inventive concept. Particularly, FIG. 1 illustrates the channel lock assembly in an exploded view while FIGS. 2, 3, 7 and 11 illustrate the channel lock assembly in position relative to the channel of a strut. FIGS. 4 through 6 and 8 through 10 illustrate the channel lock assembly in isolation in different stages between being unlocked and being locked by rotation of the rotatable locking nut. It is to be understood that the shapes and sizes of the rotatable locking nut and the retainer may be varied from the shapes and sizes shown without deviating from the spirit and scope of the disclosed inventive concept.

Referring to FIG. 1, an exploded perspective view of the channel nut and retainer assembly, generally illustrated as 10, is shown. The channel nut and retainer assembly 10 includes a rotatable nut 11 and a retainer 12. The rotatable nut 11 is preferably a cold formed steel threaded nut. The rotatable nut 11 is illustrated as having four walls including a pair of opposed side walls 13 and 13' and a pair of start and stop walls 14 and 14'. The start and stop walls 14 and 14' are utilized for both initiating and halting automatic rotation of the rotatable nut 11 as will be described below.

The rotatable nut 11 includes an upper surface 15. The rotatable nut 11 preferably includes a centrally-formed threaded bore 16 to which a component-attaching fastener is attached. The rotatable nut 11 further includes a retainer shoulder 18. A pair of spaced-apart ridges 19 and 19' are formed on the upper surface 15 of the rotatable nut 11.

The retainer 12 is provided for retaining the rotatable nut 11. The retainer 12 may be made of any of several materials in any of several ways but is preferably made of stamped heat-treated steel having a preferred but not exclusive thickness of 0.50 mm, such carbon steel having a preferred but not exclusive carbon content of between 0.50% (1050 heat treated steel) and 0.60% (1060 heat treated carbon steel). The relatively high carbon content provides for steel that is harder and stronger than steel having a smaller carbon content.

The retainer 12 includes a pair of spaced apart side walls 20 and 20' attached to a base wall 22. A retainer shoulder locator bore 24 is formed in the base wall 22 for rotatable insertion of the retainer shoulder 18.

The retainer 12 further includes structures that not only hold the channel nut and retainer assembly 10 in position relative to the strut to which it is attached but which also provide for automatic rotation of the rotatable nut 11 from its unlocked position prior to installation in the strut to its locked position following installation. A pair of actuation legs 26 and 26' extend upwardly from the base wall 22. The lower ends of the actuation legs 26 and 26' are attached to the base wall 22. The upper end of the actuation leg 26 is a rotary nut driving end 28 and the upper end of the actuation leg 26' is a rotary nut driving end 28'. The rotary driving ends 28 and 28' of the actuation legs 26 and 26' respectively provide a biasing force against the rotatable nut 11 for automatic rotation as described below.

Also extending upward from the base wall 22 is a set of channel retention legs 30, 30', 30" and 30'". The lower ends of the channel retention legs 30, 30', 30" and 30'" are attached to the base wall 22. The upper end of the channel retention leg 30 is a channel retention leg hook 32, the upper end of the channel retention leg 30' is a channel retention leg hook 32', the upper end of the channel retention leg 30" is a channel retention leg hook 32", and the upper end of the channel retention leg 30'" is a channel retention leg hook 32'". The number and placements of the channel retention legs can be varied from the illustrated number and placements. The channel retention legs 30, 30', 30" and 30'" initially constrain the retainer 12 within the channel of the strut upon attachment as described below.

Downwardly-extending from the side wall 20 is a holding leg 34 that terminates in a holding leg hook 36. Downwardly-extending from the side wall 20' is a holding leg 34' that terminates in a holding leg hook 36'. The holding legs 34 and 34' prevent the rotatable nut 11 from rotating before the channel nut and retainer assembly 10 is inserted into the strut as described below.

A retention stop 38 is provided within a window 39 formed in the side wall 20 and a retention stop 38' is provided within a window 39' formed in the side wall 20'. The retention stops 38 and 38' limit the rotation of the rotatable nut 11 upon automatic rotation as described below.

The channel nut and retainer assembly 10 is adapted for use in any one of several struts or rails. One such strut, a strut 40, is partially illustrated in FIG. 2. With reference thereto, the channel nut and retainer assembly 10 is illustrated spaced apart from the strut 40 in its pre-installation condition. With the rotatable nut 11 in place within the retainer 12, the actuation legs 26 and 26' are pushed back and are braced against the pushed and stop walls 14 and 14' of the rotatable nut 11. The potential biasing force of the actuation legs 26 and 26' is constrained at this point as the rotatable nut 11 is held against rotation by the holding legs 34 and 34'.

Figure 2:
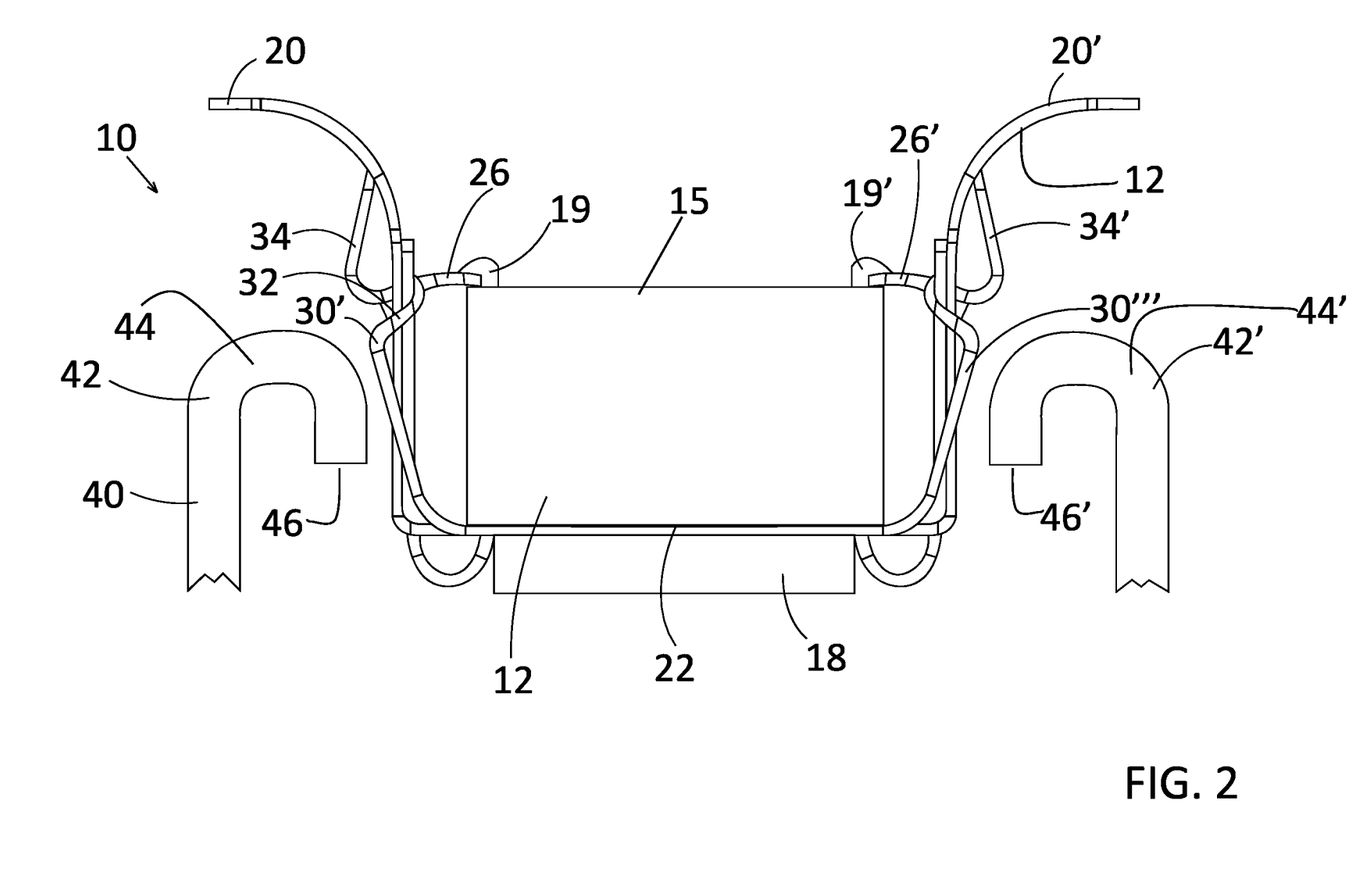
FIG. 2 is a side view of the channel nut and retainer assembly in spaced apart position relative to the upper portion of a strut.

The strut 40 includes a pair of strut arms 42 and 42'. The strut arm 42 includes an inwardly-curved shoulder 44 having a nut interface surface 46. The strut arm 42 includes an inwardly-curved shoulder 44 having a nut interface surface 46. The strut arm 42' includes an inwardly-curved shoulder 44' having a nut interface surface 46'.

Upon attachment of the channel nut and retainer assembly 10 with the strut 40, automatic rotation of the rotatable nut 11 from its stored, unlocked position illustrated in FIG. 2 to its locked, strut-engaging position is initiated. FIGS. 3 through 9 illustrate the various movements which, in actual use, are virtually instantaneous but which are set forth in these figures at discrete stages in sequence.

Figure 3:
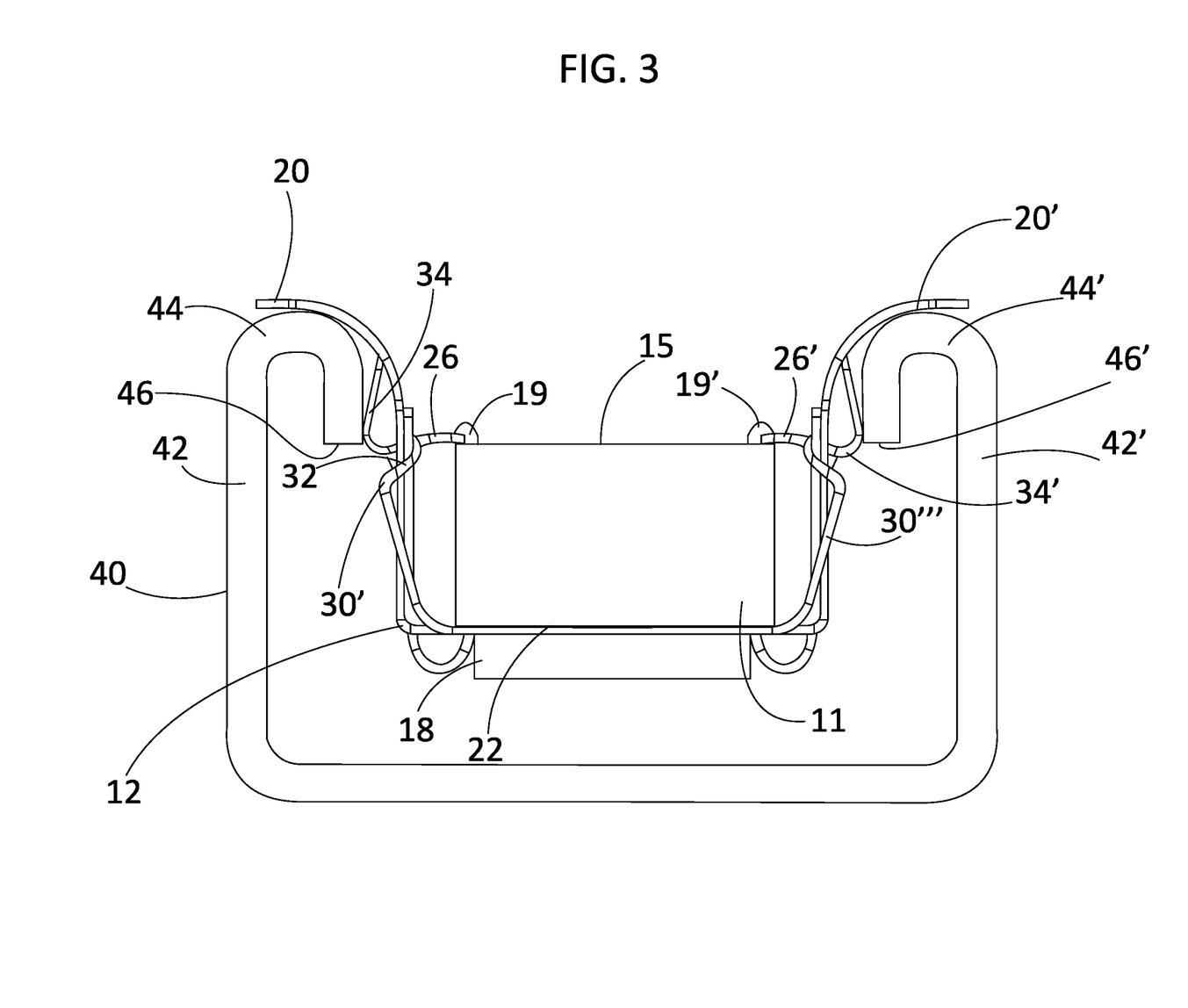
FIG. 3 is a side view of the channel nut and retainer assembly shown in its initial position relative to the strut.
Figure 4:
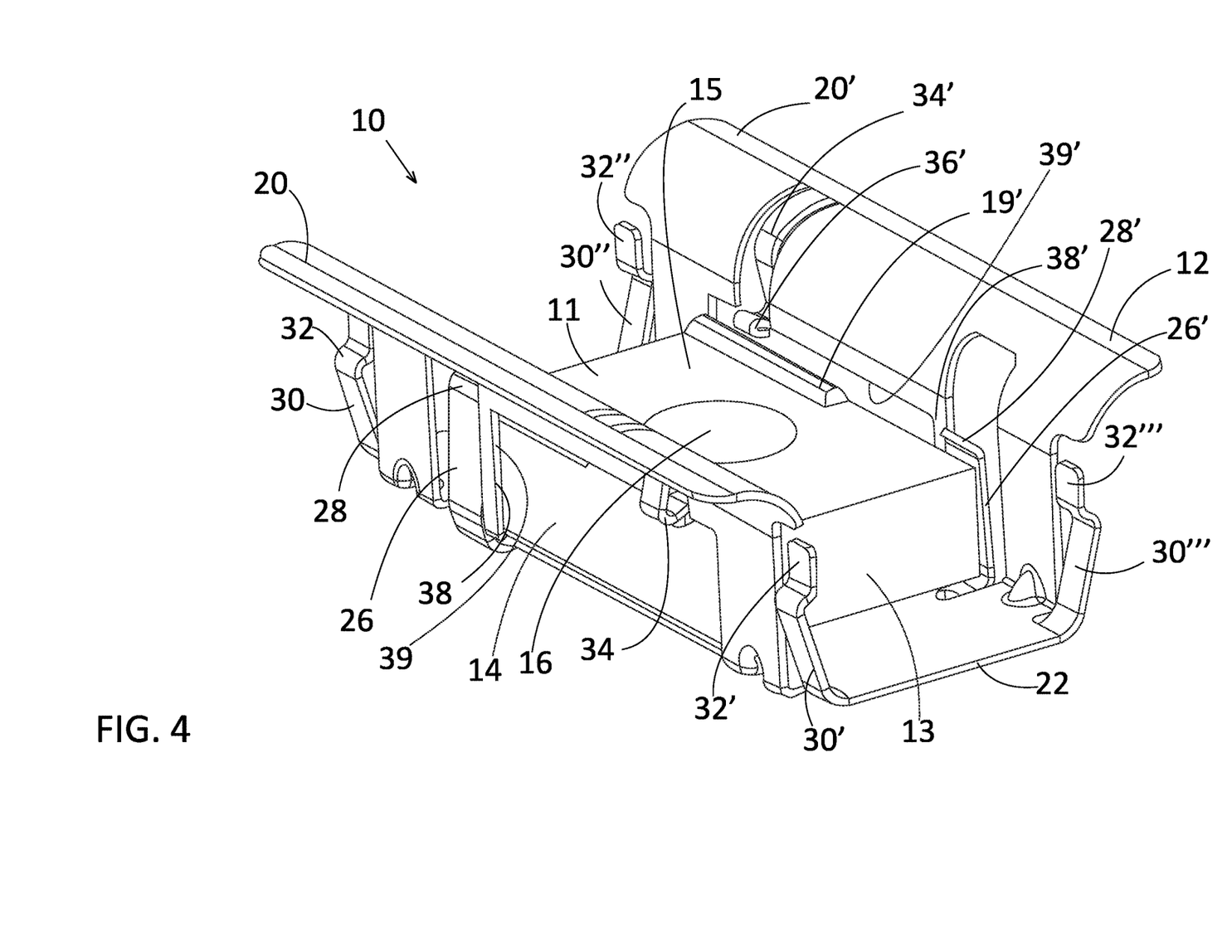
FIG. 4 is a perspective view of the channel nut and retainer assembly prior to attachment to a strut.
Figure 5:
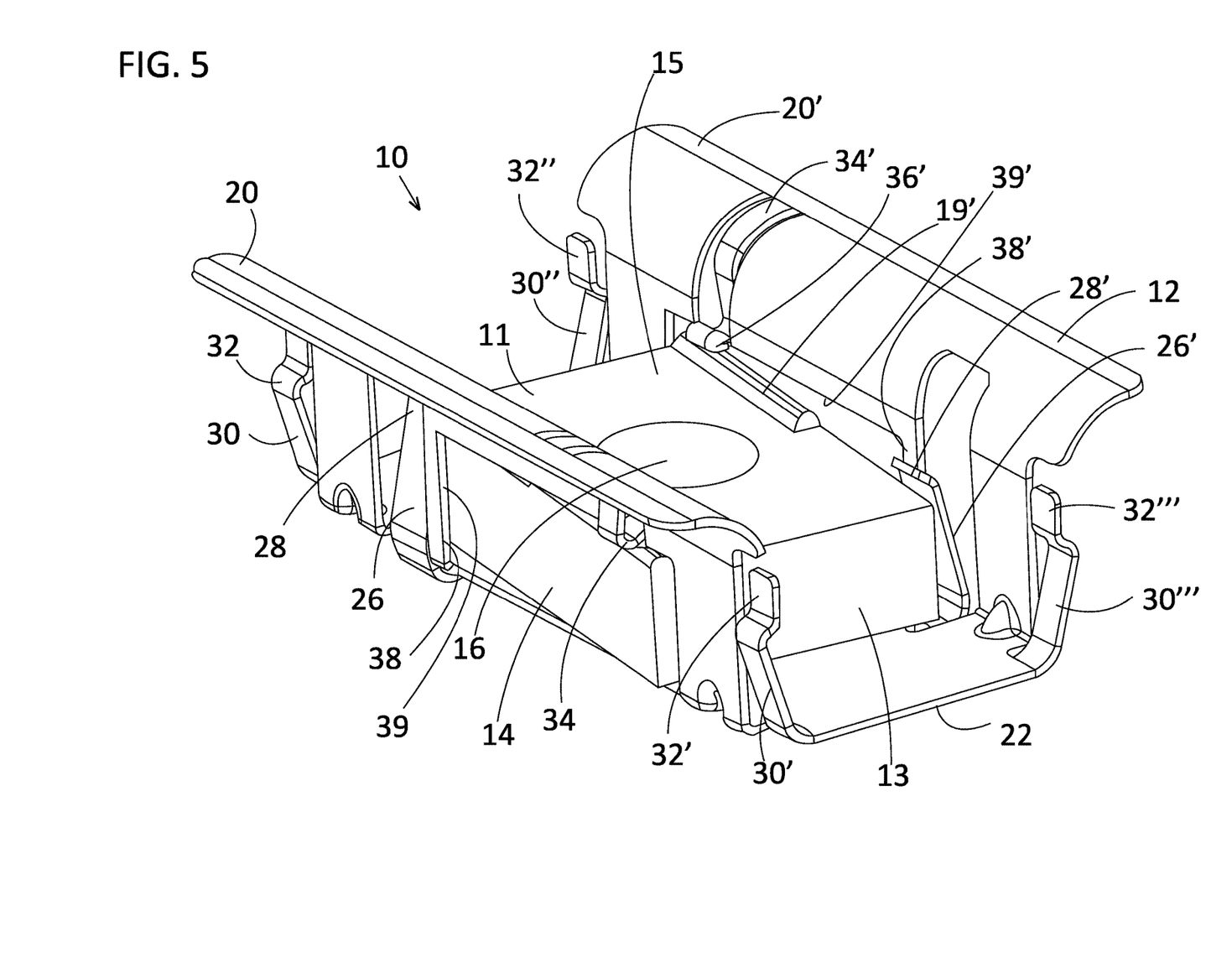
FIG. 5 is a perspective view of the channel nut and retainer assembly immediately following attachment to a strut in which the rotatable nut has been slightly rotated.

Referring to FIGS. 3 and 4, initial attachment of the channel nut and retainer assembly 10 to the strut 40 is illustrated. At this initial stage, the channel retention legs 30, 30', 30" and 30'" are deflected from the inwardly-curved shoulders 44 and 44' of the strut 40. The holding legs 34 and 34' deflect upward from the inwardly-curved shoulders 44 and 44' of the strut 40. As the holding legs 34 and 34' deflect and the holding leg hooks 36 and 36' are forced to pass over the retainer ridges 19 and 19' formed on the upper surface 15 of the rotatable nut 11, the holding legs 34 and 34' release the rotatable nut 11 for rotation, thus enabling the actuation legs 26 and 26' to exert rotary force upon the pushed and stop walls 14 and 14'. Initial rotational movement of the rotatable nut 11 is illustrated in FIG. 5 in which rotation of the rotatable nut 11 is shown as having begun.

Figure 6:
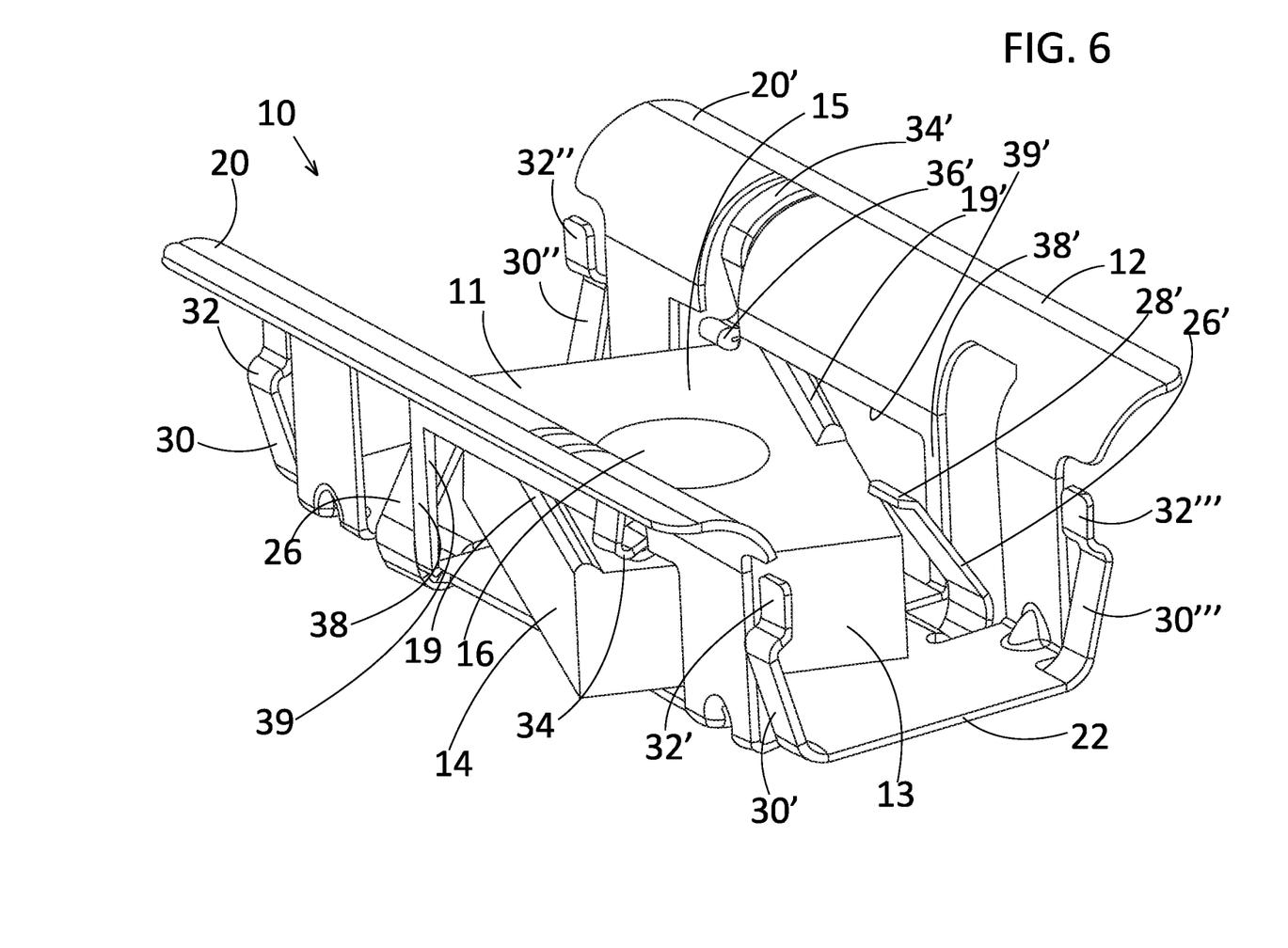
FIG. 6 is a perspective view of the channel nut and retainer assembly similar to that of FIG. 5 but showing further rotation of the rotatable nut.
Figure 7:
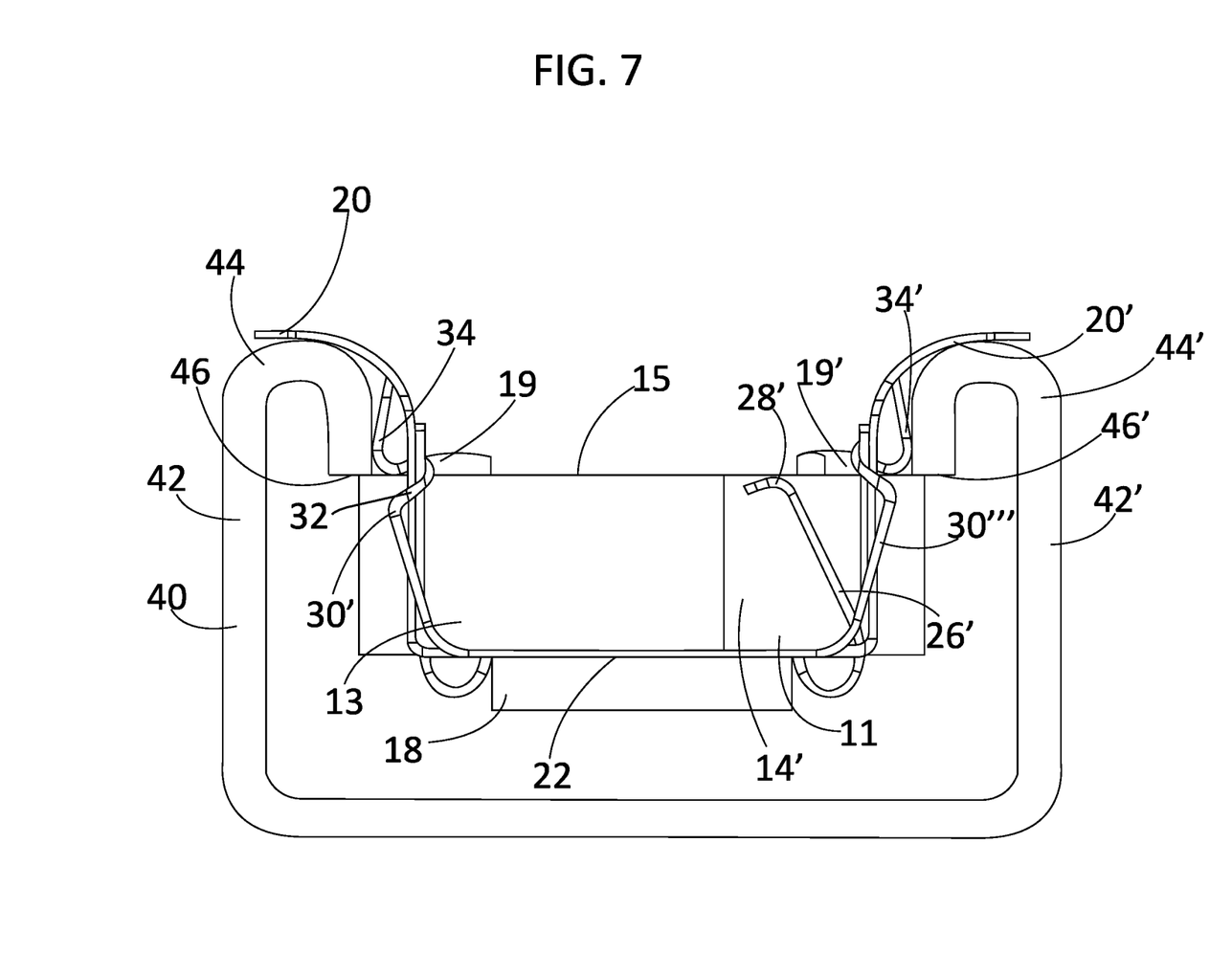
FIG. 7 is a side view of the channel nut and retainer assembly shown at the approximate mid-point between initial assembly and final lock position with the nut having been rotated as illustrated in FIG. 6.

FIGS. 6 and 7 illustrate continued movement of the rotatable nut 11 to a point about half way in its 90 degree course of rotation. FIG. 6 illustrates the channel nut and retainer assembly 10 in isolation in perspective view while FIG. 7 illustrates the channel nut and retainer assembly 10 as it is being attached to the strut 40.

Figure 8:
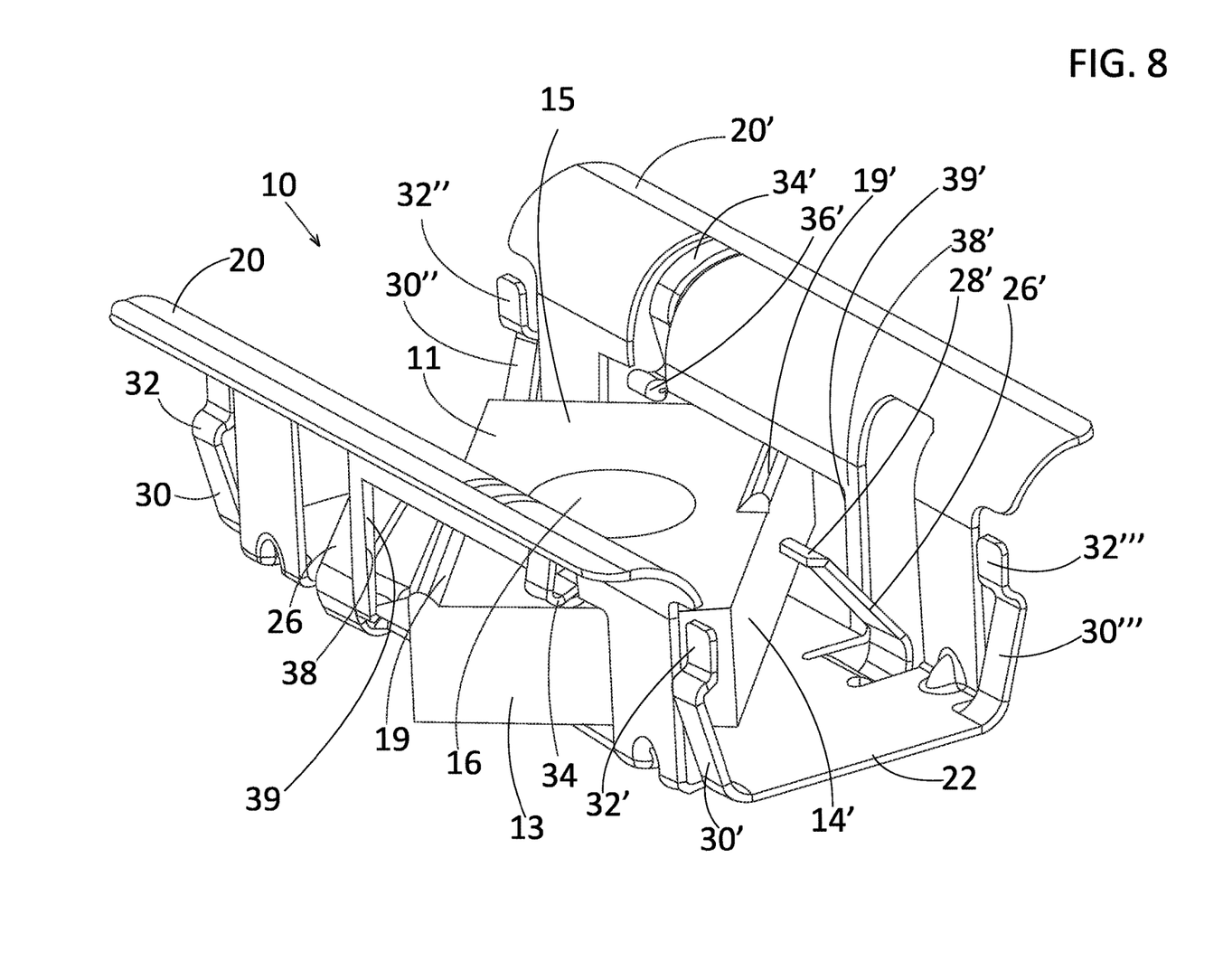
FIG. 8 is a perspective view of the channel nut and retainer assembly similar to that of FIG. 6 but showing further rotation of the rotatable nut.
Figure 9:
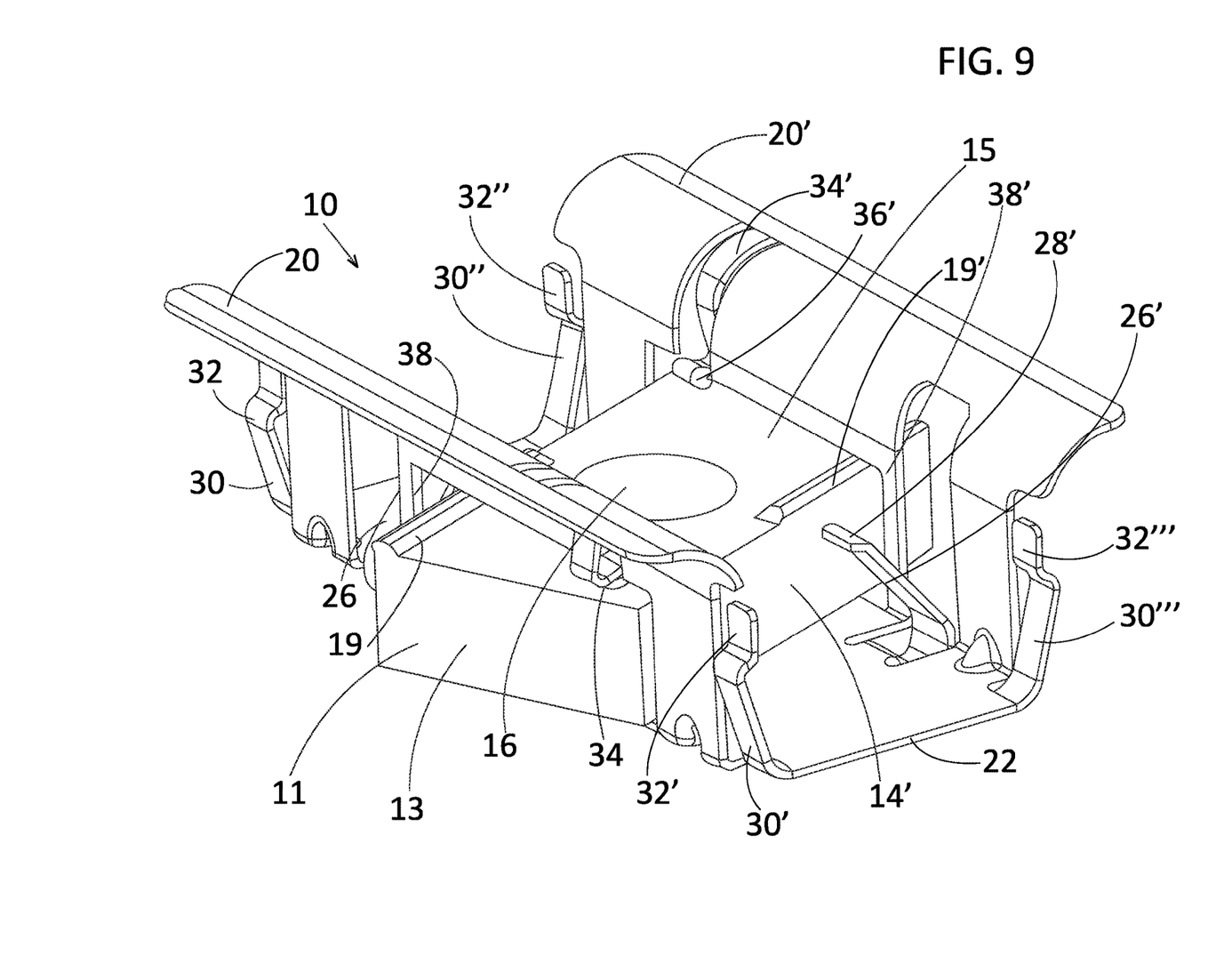
FIG. 9 is a perspective view of the channel nut and retainer assembly similar to that of FIG. 8 but showing further rotation of the rotatable nut just before its final locking position.

The final stages of the automatic movement of the rotatable nut 11 are illustrated in FIGS. 8 and 9 in which the channel nut and retainer assembly 10 is again shown in isolation in perspective view. As illustrated, the actuation legs 26 and 26' continue to exert rotary force upon the pushed and stop walls 14 and 14' and continue to rotate the rotatable nut 11 toward is fully locked position.

Figure 10:
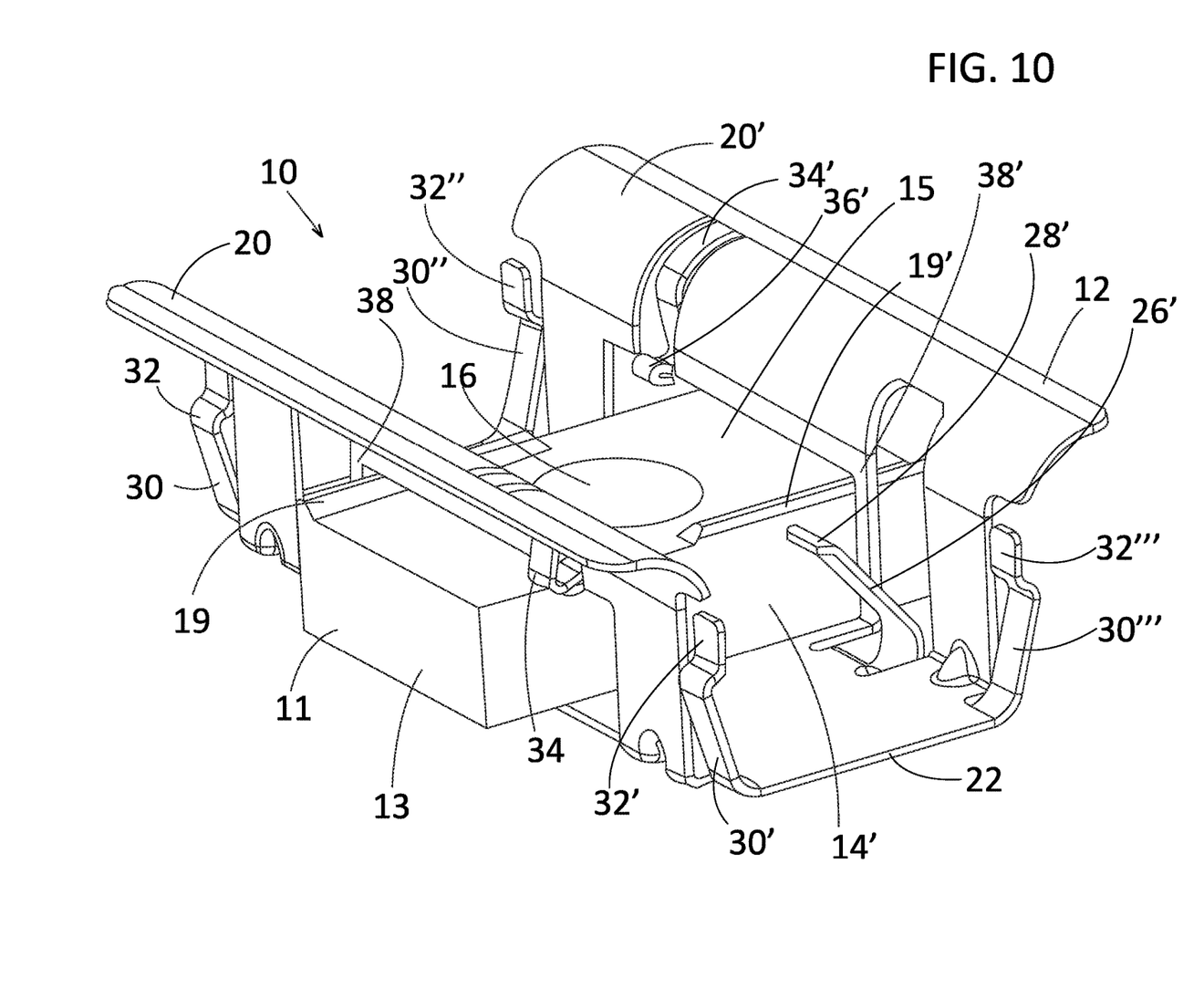
FIG. 10 is a perspective view of the channel nut and retainer assembly similar to that of FIG. 9 but showing the rotatable nut in its final locking position.
Figure 11:
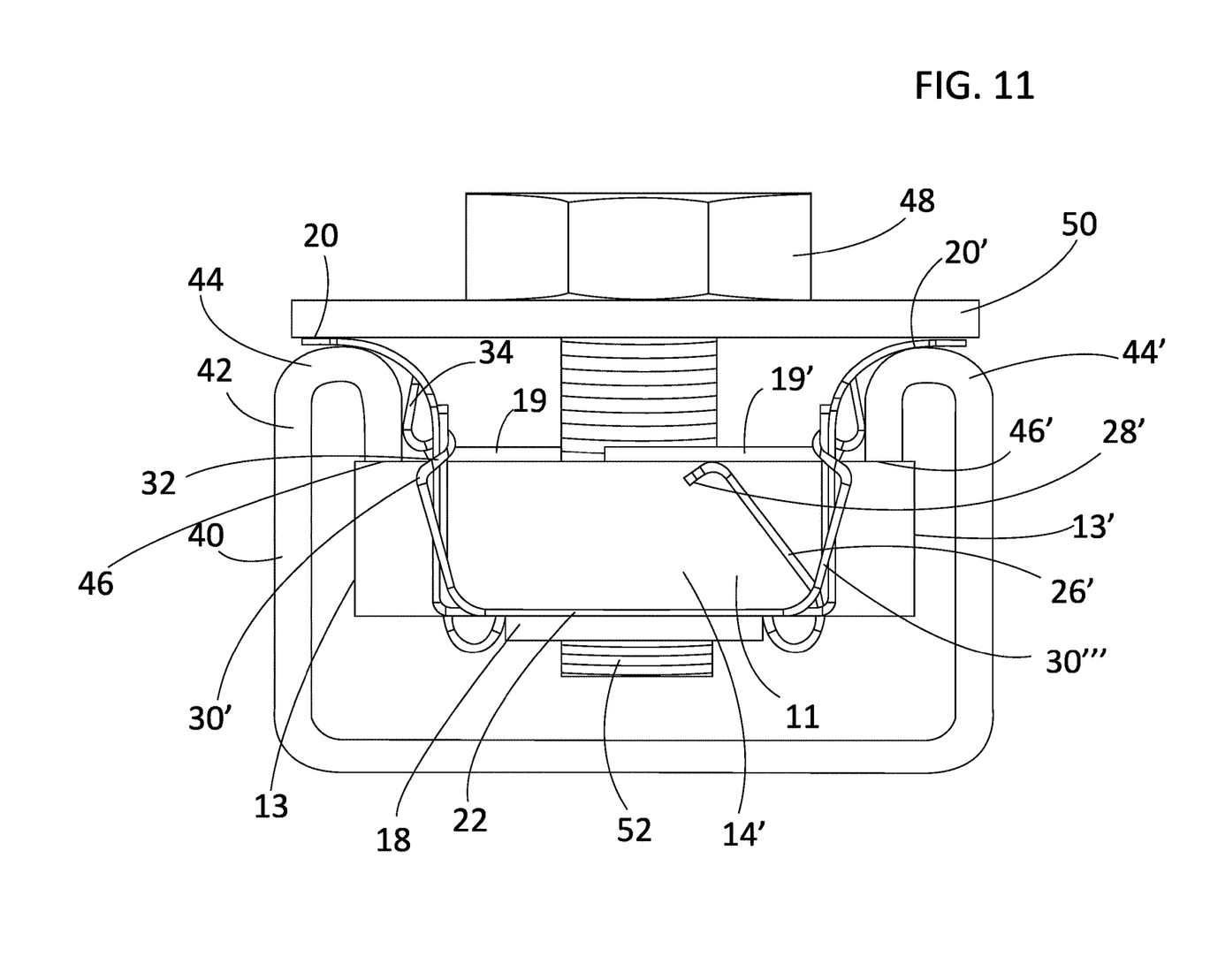
FIG. 11 is a side view of the channel nut and retainer assembly shown at the final lock position with the nut having been rotated to its stop position and further illustrating a component attached to the channel nut and retainer assembly by a mechanical fastener.

With reference to FIG. 10, the rotatable nut 11 has been moved to its fully locked position in which the long axis of the rotatable nut 11 is at a 90 degree angle relative to the long axis of the retainer 12. The rotational movement of the rotatable nut 11 has been limited by the pushed and stop walls 14 and 14' coming into contact with the retention stops 38 and 38' of the retainer 12. The fully rotated position of the rotatable nut 11 relative to the retainer 12 is also illustrated in FIG. 11 in which the upper surface 15 of the rotatable nut 11 has been moved into locking contact with the nut interface surfaces 46 and 46' of the strut arms 42 and 42' respectively of the strut 40. Thus engaged, the channel nut and retainer assembly 10 is locked against movement within the strut 40. A fastener, such as a mechanical fastener 48 may then be used to attach a component 50 to the channel nut and retainer assembly 10. Particularly, the fastener 48 may include a thread 52 for mechanical attachment to the rotatable nut 11.

The disclosed inventive concept provides an effective system for attaching a component to a strut or rail utilizing a minimum number of parts and enabling the installer to easily and quickly attach the channel nut and retainer assembly to the strut or rail with only one hand because of the automatic, 90 degree rotation of the rotatable nut 11 relative to the retainer 12. The disclosed inventive concept eliminates the need to first locate the assembly to the desired position on the strut or rail by placing the nut within the strut or rail and then having to slide the nut into position. The disclosed inventive concept may find application on a strut or rail on any surface, whether vertically or horizontally aligned.

As noted above, the shape and configuration of the channel nut and retainer assembly 10 may be varied. For example, the rotatable nut 11 may be longer or narrower and may have additional sides. The retainer 12 may also be longer and narrower. The number and placement of some of the operational structures of the retainer 12 may be altered, such as the number and placement of the channel retention legs 30, 30', 30" and 30'". All of these changes may be made without deviating from the spirit or scope of the disclosed inventive concept while nonetheless providing optimum performance. The disclosed inventive concept may be used with any type of strut or rail.

One skilled in the art will readily recognize from such discussion, and from the accompanying drawings and claims that various changes, modifications and variations can be made therein without departing from the true spirit and fair scope of the invention as defined by the following claims.

What is claimed is:

1. A fastener assembly for use with a strut having a channel defined by opposed parallel sides, each side having an upper edge, the assembly comprising:
   a rotatable nut having a bore and opposed walls; and
   a retainer comprising a base wall and a pair of opposed side walls, each of said walls having an upper flange and a cantilevered holding leg extending from said upper flange for fitting over the upper edges of the sides of the channel, said retainer further including actuation legs extending from said base wall, each of said actuation legs including a base wall connecting end and a nut driving end, said nut driving end defining an actuation leg hook, said retainer further including retention legs extending from said base wall, each of said retention legs including a leg holding hook, said retainer further including rotation stops extending between said base wall of said retainer and said upper flanges.

* * * * *